(12) United States Patent
Calkins

(10) Patent No.: US 6,352,288 B1
(45) Date of Patent: Mar. 5, 2002

(54) THRUST AND TORQUE RESISTANT PIPE JOINT

(75) Inventor: John E. Calkins, Wayne, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/567,610

(22) Filed: May 10, 2000

(51) Int. Cl.$^7$ .............. F16L 35/00; F16L 37/00
(52) U.S. Cl. ............ 285/305; 285/330; 285/371
(58) Field of Search ................... 285/305, 330, 285/369, 370, 371

(56) References Cited

U.S. PATENT DOCUMENTS

| | | | | |
|---|---|---|---|---|
| 3,127,199 A | * | 3/1964 | Roe | 285/305 X |
| 3,220,754 A | * | 11/1965 | Mori | 285/305 |
| 3,245,702 A | * | 4/1966 | Smith | 285/305 |
| 3,633,928 A | | 1/1972 | Smith | 277/206 R |
| 4,061,078 A | | 12/1977 | Lifshits et al. | 90/24 C |
| 4,234,215 A | | 11/1980 | Wilson | 285/41 |
| 4,323,268 A | | 4/1982 | Wilson | 285/41 |
| 4,427,221 A | * | 1/1984 | Shay, Jr. | 285/305 |
| 4,749,192 A | * | 6/1988 | Howeth | 285/305 X |
| 5,308,124 A | | 5/1994 | Yamaji et al. | 285/328 |
| 5,868,443 A | | 2/1999 | Ungerman et al. | 285/369 |
| 5,992,905 A | | 11/1999 | Kennedy, Jr. et al. | 285/337 |

* cited by examiner

*Primary Examiner*—Neill Wilson
(74) *Attorney, Agent, or Firm*—Duane Morris & Heckscher LLP

(57) ABSTRACT

Mechanical pipe connections are provided by this invention which include the feature of coupler recesses with discontinuous locking grooves on the pipes. The interlocking system may also include male and female portions which mechanically mesh together to form binding contact between the pipes to reduce the individual rotation of the pipes relative to one another.

12 Claims, 6 Drawing Sheets

THRUST AND TORQUE RESISTANT PIPE JOINT

FIELD OF THE INVENTION

This invention relates to devices for coupling pipes together, and more particularly, to the coupling of pressurized or non-pressurized piping so as to minimize rotation of one length of pipe relative to the adjacent length of pipe, while simultaneously preventing the pipes from separating.

BACKGROUND OF THE INVENTION

Pipe junction restrainers and techniques for their assembly have been developed to make fluid-tight connections between two axially-aligned pipes, joints, valves, fittings, hydrants, or other types of fluid connections. Often, these junction restrainers must withstand extraordinarily great pressures associated with water distribution and sewer connections. Such devices may include, for example, segmented or split pipe joint retainer glands, which are well known and typically are secured together around a pipe section by ears or lugs formed on, or extending radially outwardly from, the gland segments.

It has been current practice to employ polyvinyl chloride (PVC) plastic pipe in new construction. One popular system employed for connecting PVC pipe, sold under the trademark CERTA-LOK™ and produced by CertainTeed Corporation, Valley Forge, Pennsylvania, provides a rather unique restrained joint between a pair of pipe sections for municipal, fire protection and other uses. The joint connector uses a series of o-ring seals and internal annular cavities that are filled externally with polymeric dowels after two sections of PVC pipe are inserted into the connector. These dowels also fill matching annular cavities located on the pipe sections to form a restraining mechanical lock that can withstand considerable axial thrust. Since the restraining mechanism of the CERTA-LOKυ joint connector is uniformly distributed around the PVC pipes, the risk of damaging the plastic sidewalls by localized stress fracture can be minimized.

It has been recently understood that the CERTA-LOK™ system permits each of the axially-aligned plastic pipes to rotate relative to one another after they are joined together. These pipes are often subjected to torsion, such as when connected to a submersible electric pump, which creates torque throughout the piping system and may cause rotation of one or both pipes during the pumping of fluids. An excessive amount of rotation may cause damage due to abrasive wear on the outside of the pipe, or breakage to the electrical wires, and/or supporting cable for the pump.

One method of preventing the relative rotation of pipes coupled using a CERTA-LOK™ pipe connection system has been to install set screws through the tubular fitting member surrounding the pipe. Although this method has some effect on reducing rotation, the effect is often of limited value.

SUMMARY OF THE INVENTION

Mechanical pipe connections are provided by this invention which include a tubular fitting member designed to receive the ends of a pair of fluid pipes. The first and second ends of the first and second of these pipes may optionally comprise a male coupler and a matching female coupler recess which can be interlocked after the pipes are inserted into the tubular fitting member to minimize rotation between the pipes. The coupler recesses of the pipes are uniquely structured, as will be explained below.

A prior invention (U.S. Pat. No. 5,868,443, herein incorporated by reference) provides an improved mechanical means for fitting a pair of pipes locked together with a CERTA-LOK™-type system so as to minimize thrust and rotation during pumping operations and the like. In the preferred embodiment of that invention, a portion of the ends of each pipe are extended about 0.5–1.5 inches or so past the center line of the tubular fitting member to occupy non-extended space at the end of an opposing pipe. Rotation of either pipe will cause the extended approximately one-half circumference of the first pipe to come into contact with the extended approximately one-half circumference of the opposing pipe of that embodiment. This contact inhibits the rotation of one pipe relative to the other pipe without the need for set screws. Of course, it is apparent that less than one-half of the circumference of each pipe is sufficient, so long as there is locking contact between a male coupling portion located on one pipe and the female coupling recess located on the other.

In the prior invention, a mechanical pipe connection was provided which included a tubular fitting member having a pair of open ends for receiving a pair of pipe end portions. The fitting member included an annular locking means for locking the fitting member to each of the pipe portions once they have been inserted. The first of the pipe end portions included a male coupler extending therefrom, and a second of the pipe end portions included a female coupler recess for receiving the male coupler in locking arrangement within the tubular fitting. This locking arrangement minimizes the degree to which the first and second pipe end portions can rotate relative to one another.

In a preferred embodiment of the present invention, the first and second pipes include a first pair of coupler recesses with discontinuous locking grooves; the tubular fitting member comprises a pair of second coupler recesses which can be interlocked with the first pair of coupler recesses of the first and second pipes for minimizing separation and rotation of the first and second pipes relative to one another.

BRIEF DESCRIPTION OF THE DRAWINGS

FIGS. 1–6 illustrate preferred embodiments of the prior art, while

FIG. 1: is a front perspective view of a mechanical pipe connection;

FIG. 2: is a cross-sectional front perspective view of a preferred tubular fitting member;

FIG. 3: is a front elevation view of a preferred end portion of one of the pipes used in the mechanical pipe connection;

FIG. 4: is a side elevation, enlarged view of a joining area between a pair of pipes in the mechanical pipe connection;

FIG. 5: is an exploded, partial perspective view of a pair of pipes used in the mechanical pipe connection;

FIG. 6: is a partial, cross-sectional side perspective view of the mechanical pipe connection;

FIG. 7: is a cross-sectional view of one of the pipes used in the mechanical pipe connection of the present invention;

FIG. 8: is a cross-sectional view of a joining area of the tubular fitting member used in the mechanical pipe connection of the present invention;

FIG. 9: is a side elevation view of a pipe and tubular fitting member used in the mechanical pipe connection of the present invention;

FIG. 10: is a cross-sectional view of an assembled, preferred mechanical pipe connection of the present invention;

FIG. 11: is a side elevation view of an assembled, preferred mechanical pipe connection of the present invention.

DETAILED DESCRIPTION OF THE INVENTION

This invention provides an improved means of manufacturing mechanical joints, such as those used between piping materials, including pipes, valves, various pipe fittings, hydrants, and miscellaneous connections and piping systems, including sewer systems, water distribution systems, and chemical transport systems, as is taught in U.S. Pat. No. 5,868,443, herein incorporated by reference. As used herein, the term "pipe" includes all of the above connections and those that are consistent with the principles of this invention.

Figure 1:
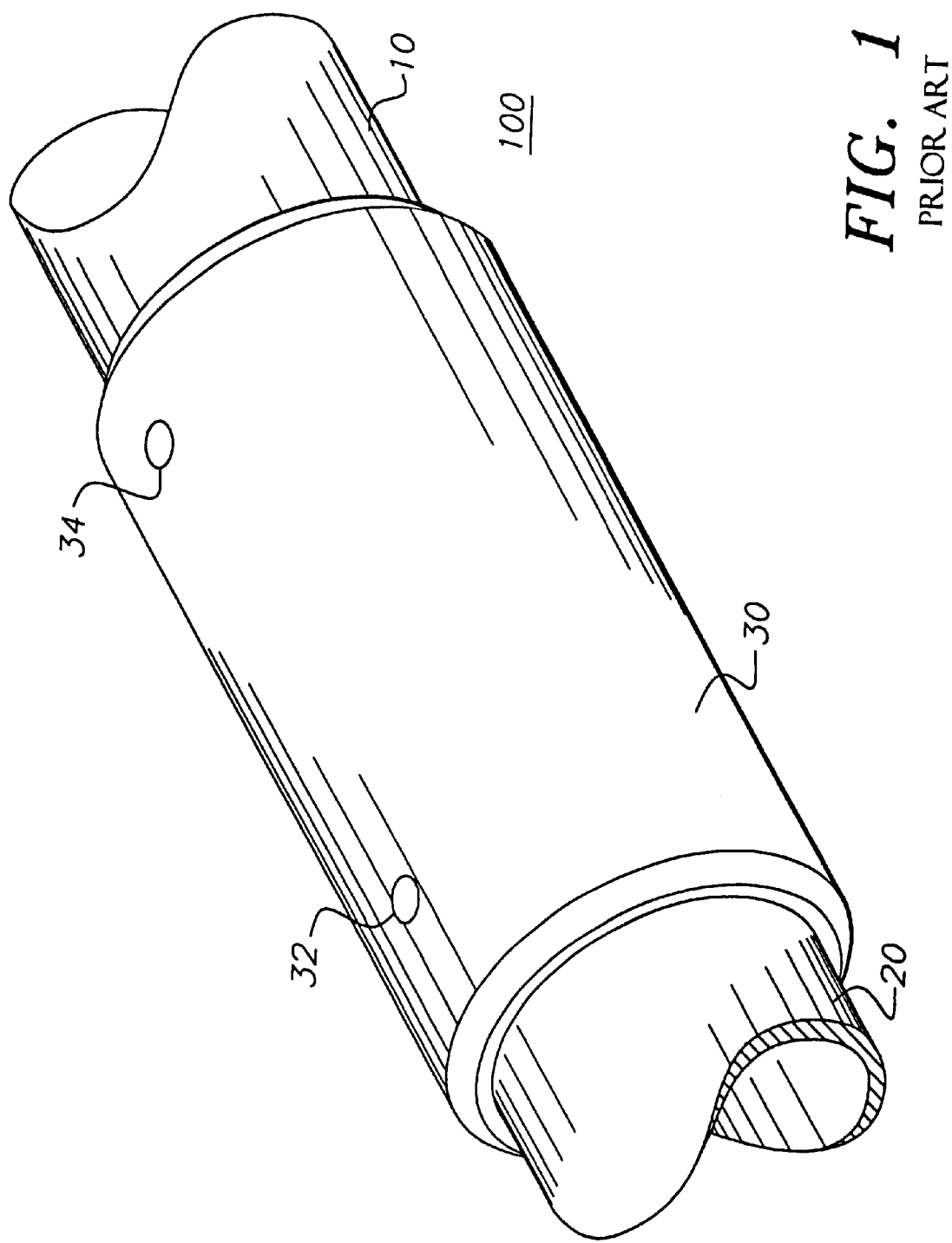
Figure 2:
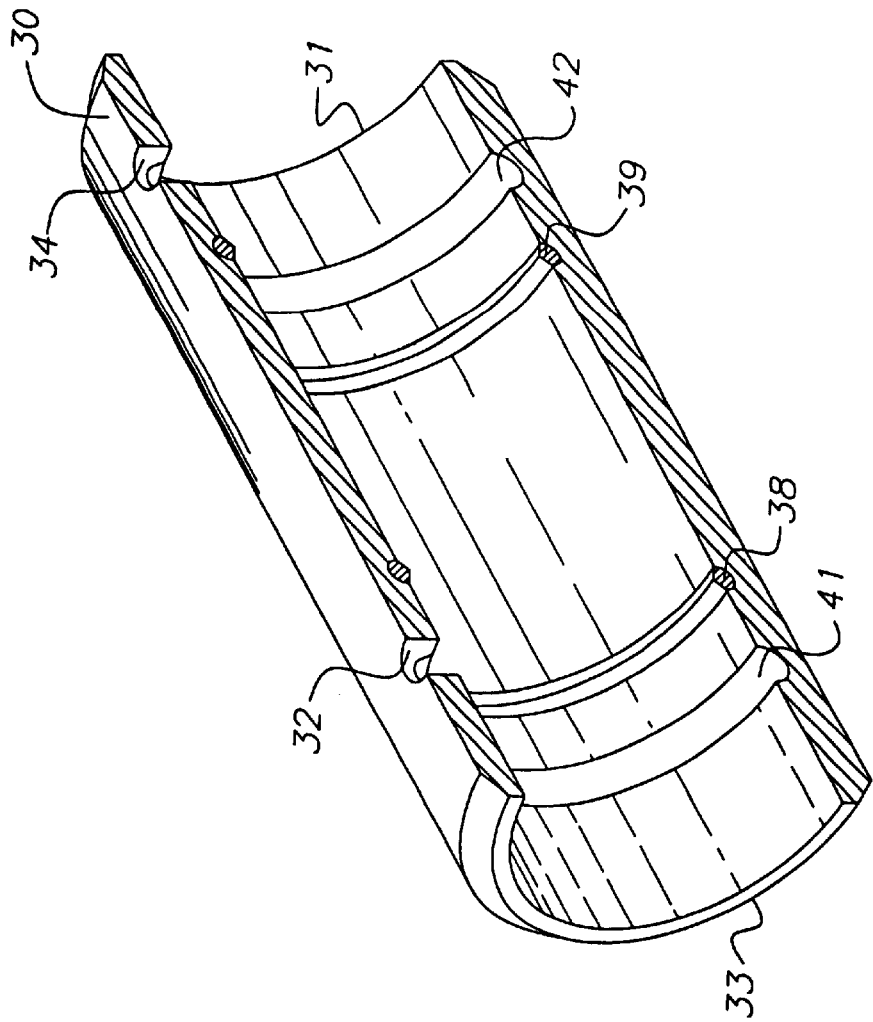

With reference to FIGS. 1 through 6 thereof, which illustrate the prior art, a mechanical pipe connection 100 will now be described. This connection 100 includes a tubular fitting member 30 having a pair of open ends 33 and 31, as shown in FIG. 2, for receiving a pair of pipes 10 and 20. The pipes are shown in axial alignment, although such a system could be employed even if these pipes are not aligned in a straight line. Although the tubular fitting member 30 is designed for meeting around the pipes 10 and 20, it is understood that pipes 10 and 20 could be less desirably fitted around the outside of the tubular fitting member 30, by reversing the location of the annular recesses 41, 42, 51 and 52 so as to form annular recesses on the inside surfaces of the pipes 10 and 20 and the outer surface of the tubular fitting member 30.

Figure 6:
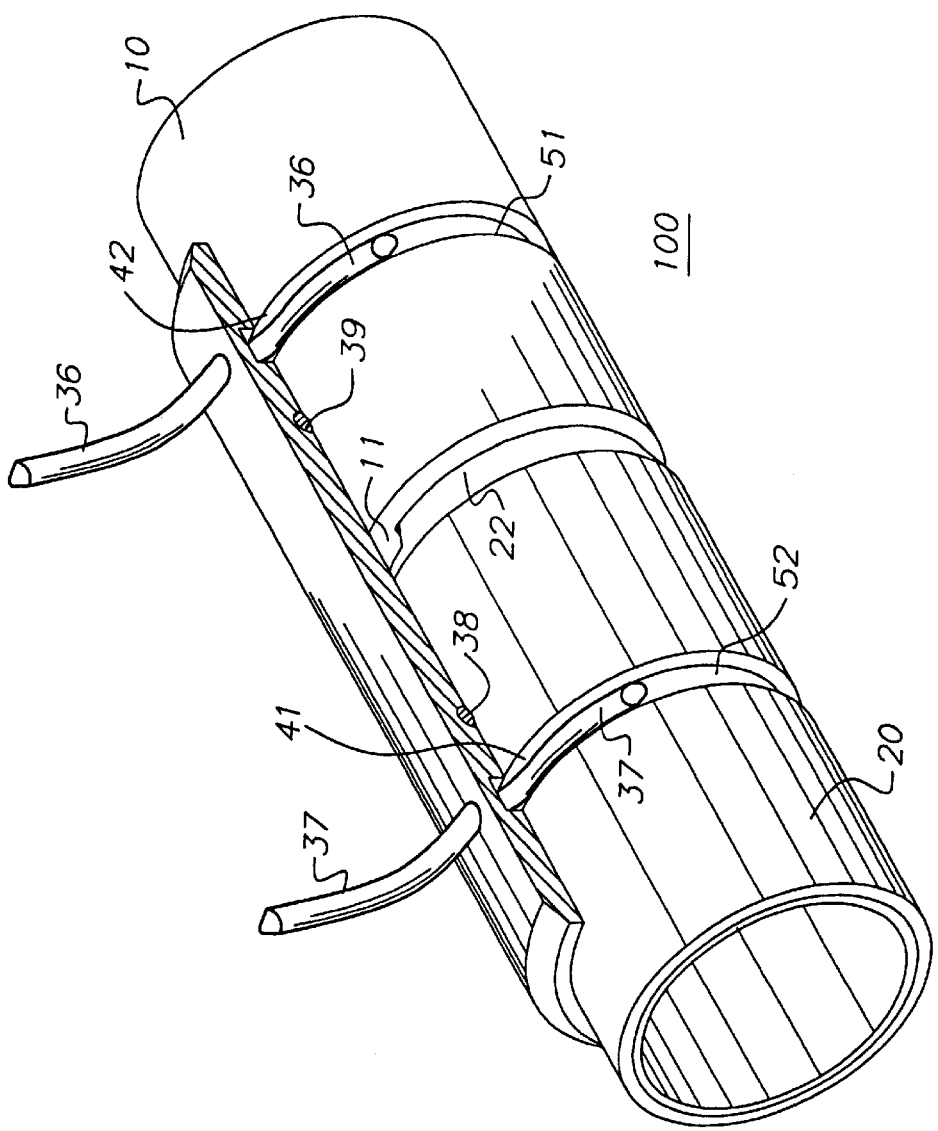

As shown substantially in FIGS. 2 and 6, pipes 10 and 20 are inserted into the first and second open ends 31 and 33 beyond the annular recesses 41 and 42 so as to come into a sealing contact with rubber gaskets 38 and 39. In typical CERTA-LOK™ systems, the pipes are spaced about 0.5 inches away from one another, so as to permit rotation during use. In a further aspect of the prior art, the end of the first pipe includes a male coupler and the end of the second pipe comprises a female coupler recess which can be interlocked within the tubular fitting member 30, preferably with one another as opposed to interlocking with the tubular fitting member 30, for reducing a rotation of the pipes relative to one another.

Once the pipes 10 and 20 are inserted sufficiently so as to approximately match their recesses 51 and 52 with the inner annular recesses 41 and 42 of the tubular fitting member 30, one or more flexible splines 36 and 37 can be inserted into the through-holes 32 and 34 conveniently bored through the sidewall of the tubular fitting member 30. In this way, a mechanical lock can be provided between the pipes 10 and 20 and the tubular fitting member 30 which is convenient to reverse, so as to enable removal of the pipes, if the system needs to be moved or replaced.

Figure 3:
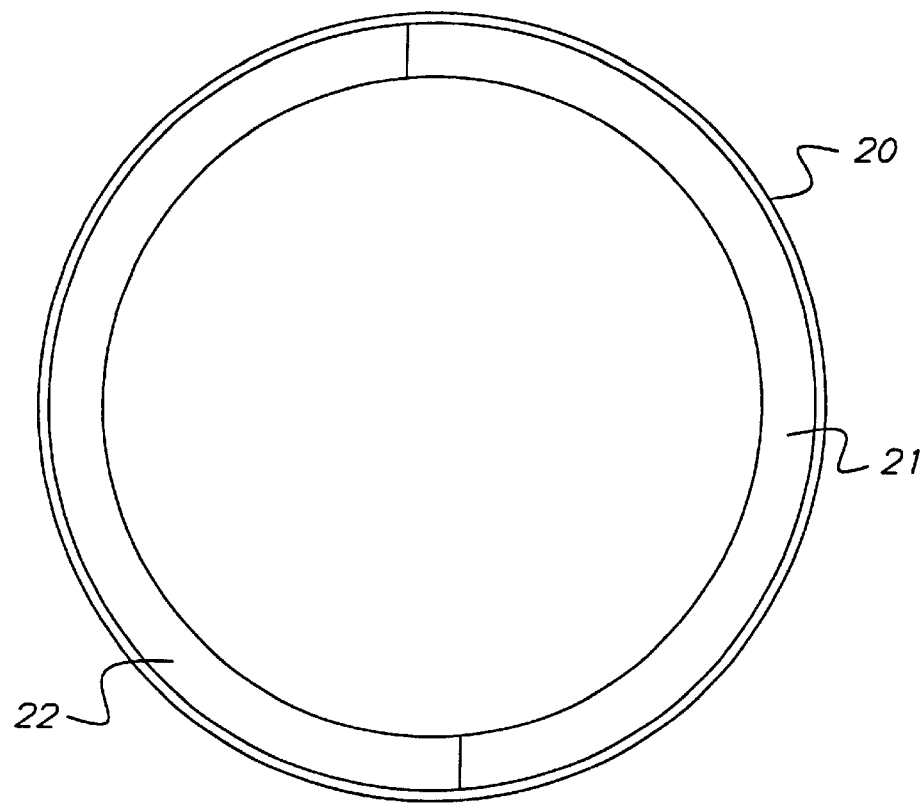
Figure 4:
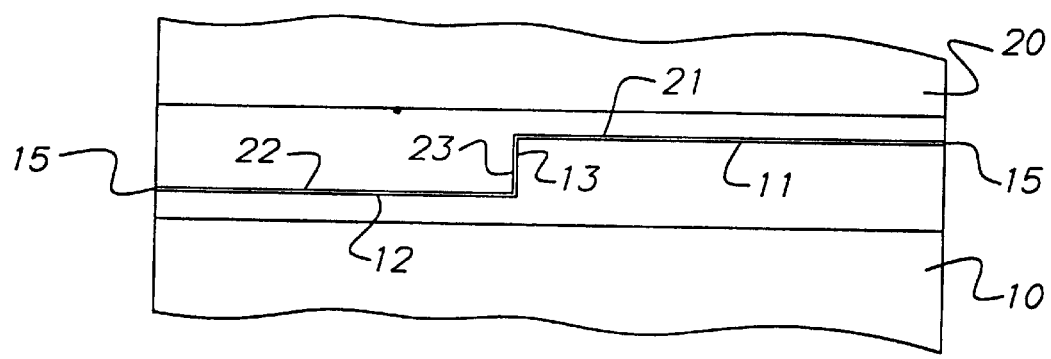
Figure 5:
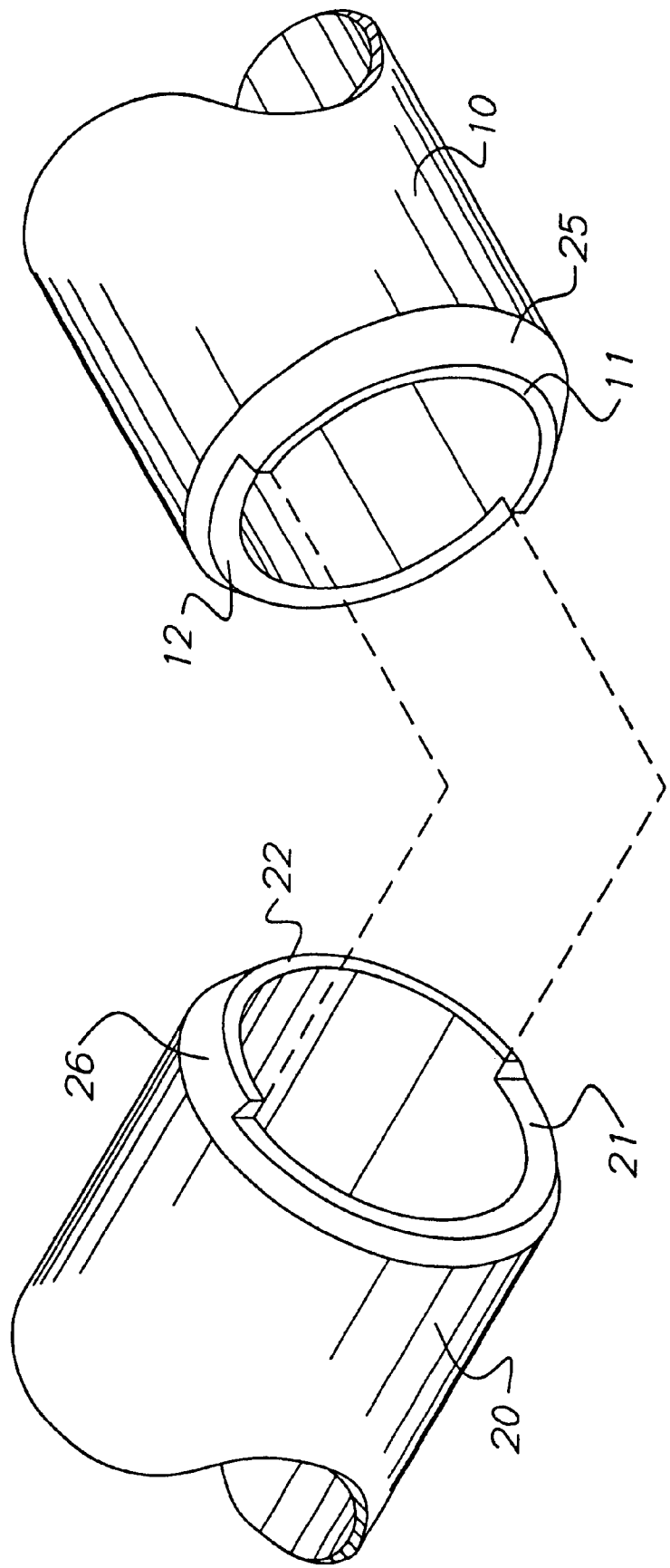

With reference to FIGS. 3–5, an embodiment of the interlocking system of the prior art will now be described. In the preferred pipe embodiment shown in FIG. 3, approximately one-half of the circumference of plastic pipe 20 is machined into a female portion 21, the other remaining portion is left as a male portion 22. Pipe 10 could also be fitted with male and female portions 11 and 12 respectively. Upon joining, as shown substantially in FIG. 4, male portion 11 fits with female portion 21 and female portion 12 fits with male portion 22. A clearance 15 of less than about 0.25 inches can be provided without interfering with the operation. When one or the other of pipes 10 and 20 begin to rotate, edge 13 comes in binding contact with edge 23 to minimize, or nearly eliminate rotation. In a preferred embodiment, the degree to which a portion of the plastic pipe is recessed, or machined away, can be greater than 90 degrees, but is more preferably about 180 degrees of the circumference of the pipe.

As shown in FIG. 5, the pipes 10 and 20 can be nearly mirror images of one another transposed 180 degrees apart, so that their mating male and female portions 11,12,21 and 22 fit together in a locking arrangement. Additionally, the extended male portions 22 and 11 and recessed female portions 12 and 21 can include beveled edges 25 and 26 along their outer periphery so as to permit smooth insertion into the tubular fitting member 30. Following insertion into the hollow cavity of the tubular fitting member 30, the annular recesses 51 and 52 of the pipes 10 and 20 come into alignment with the inner annular recesses 41 and 42 of the tubular fitting member 30 to form annular cavities. At that point the rubber gaskets 38 and 39 come into sealing contact with the outer diameter of pipes 10 and 20 to prevent any leakage from the mechanical pipe connection 100. Flexible splines 36 and 37 can thereafter be inserted into the throughholes 32 and 34 and into the formed annular cavities to create a mechanical lock between the pipes 10 and 20 and the tubular fitting member 30, as shown in FIG. 6.

For purposes of the present invention, it should be understood that the "male/female" coupler mechanism as described above is but one preferred means of connecting pipe units. The female portion could be, e.g., a separate coupler, or integral with one of the pipes.

Figure 7:
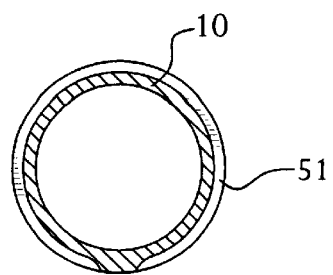
FIGS. 7–11 illustrate preferred embodiments of the present invention.
Figure 8:
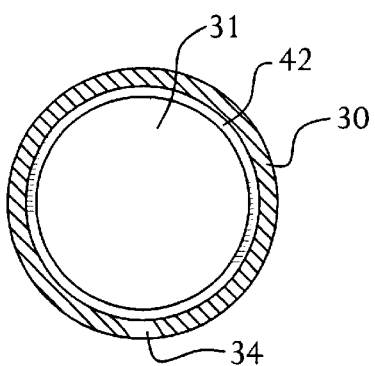
Figure 9:
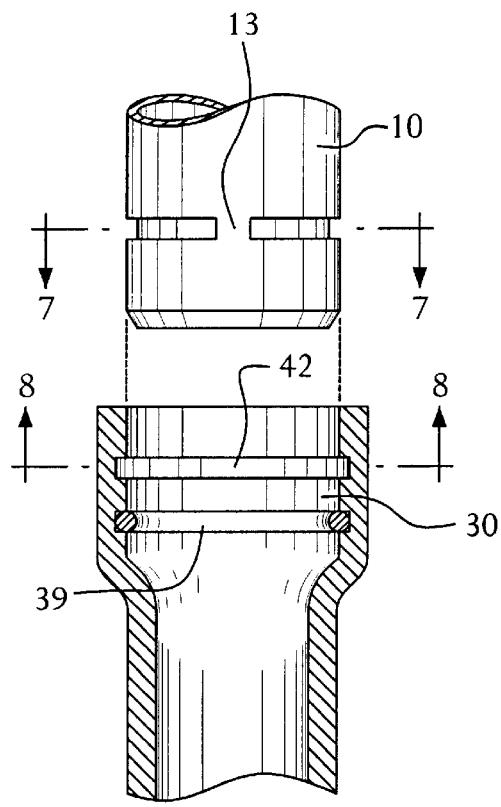
Figure 10:
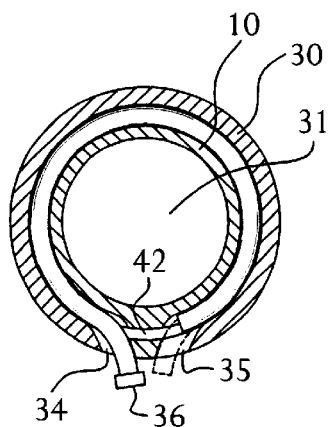
Figure 11:
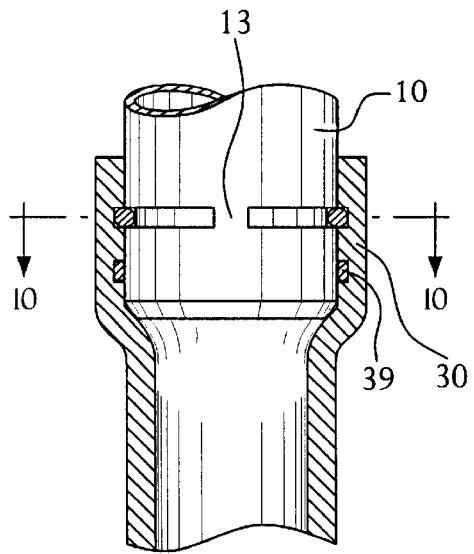

With reference to FIG. 7, which illustrates the present invention wherein the coupler is an integral part of one of the pipes, a cross-sectional view of pipe 10 with annular recess 51 is shown. Note that the annular recess 51 is discontinuous. As shown in FIG. 8, tubular fitting member 30 includes inner annular recess 42 and through-hole 34. As shown substantially in FIG. 9, pipe 10 is inserted into an opening beyond inner annular recess 42 so as to come into a sealing contact with rubber gasket 39. A lobe or uncut portion 13 of discontinuous annular recess or groove 51 on pipe 10, which is the result of the discontinuous groove 51 being formed on pipe 10, serves to resist rotation of forces by "locking" the spline (36 in FIG. 10) into place and preventing unidirectional rotation resistance (if one through-hole 34, as in FIG. 8, is in place on tubular fitting member 30), or, alternatively bidirectional rotation resistance (if two through-holes 34 and 35, as in FIG. 10, are in place on tubular fitting member 30). In FIGS. 10 and 11, pipe 10 is inserted into open end 31 beyond annular recess 42 so as to come into a sealing contact with rubber gasket 39. The ends of flexible spline 36 may also possess one or more knobs to help secure the spline 36 in place. It is to be further understood that there may be other materials, such as, e.g., a hot-melt adhesive, which may be inserted into through-holes 34 and 35 in order to accomplish the purposes of the present invention.

Thus, the present invention uses a single mechanism to accomplish both thrust resistance and rotation resistance. This is accomplished through the use of matching, locking grooves on the pipes, with the improvement being that the locking grooves are not completely cut around the circumference of the pipes, but end a few degrees "short" of making a complete circular groove. This "uncut" portion serves as a block or protrusion which will prevent rotation through the joint by coming in contact with the locking spline, which is positioned on either one or both sides of the protrusion. The locking spline is immovable, as it goes through the side of the adjoining pipe.

From the foregoing, it can be realized that this invention provides improved pipe connections for minimizing the rotation of mechanically connected fluid pipes so as to avoid damaging electrical wiring or the pipe walls. The male-female locking interconnection of a preferred embodiment of this invention can be easily produced by machining or molding matching recesses in the opposing surfaces of axially-aligned pipes (e.g., PVC pipes) so that they meet in locking fashion to prevent separate rotation. Although various embodiments have been illustrated, this was for the purpose of describing, and not limiting the invention. Various modifications, which will become apparent to one skilled in the art, are within the scope of this invention described in the attached claims.

What is claimed is:

1. A mechanical pipe connection which provides simultaneous rotation and thrust resistance between first and second pipes having a first and second ends respectively; said connection further including a tubular fitting member having a pair of open ends for receiving said first and second ends of said first and second pipes, wherein said tubular fitting member comprises a pair of annular recesses disposed approximately near a pair of ends of said tubular fitting member; and wherein said first and second ends comprise a discontinuous annular recess for corresponding with said annular recesses of said tubular fitting member to form a pair of annular cavities, wherein said first end comprises a male coupler and said second end comprises a female coupler recess which can be interlocked within said tubular fitting member for reducing a rotation of said first and second pipes relative to one another.

2. The mechanical pipe connection of claim 1 wherein the annular recess of said first end of said first pipe comprises an uncut portion.

3. The mechanical pipe connection of claim 2 wherein said male coupler comprises a remaining portion of said first end of said first pipe which has not been recessed.

4. The mechanical pipe connection of claim 1 wherein said first and second ends comprise a pipe cross section in which a portion of the circumference of said pipe has been removed.

5. The mechanical pipe connection of claim 1 wherein said male-and female couplers comprise complementary surfaces for interlocking with one another to prevent rotation of said first and second pipes so as to reduce axial misalignment.

6. The mechanical pipe connection of claim 1 wherein said first and second ends of said first and second pipes comprise first and second recessed portions and first and second remaining portions, whereby said first recessed portion approximately matches the shape of said second remaining portion and said first remaining portion approximately matches the shape of said second recessed portion.

7. A mechanical pipe connection which provides simultaneous rotation and thrust resistance between the end portions of at least two substantially linearly aligned pipes, comprising:

a tubular fitting member having a pair of open ends for receiving said pipe end portions, said tubular fitting member including annular locking means for locking the tubular fitting member to said pipe end portions;

wherein said tubular fitting member comprises a pair of interior annular recesses;

wherein said first and second pipe end portions comprise a discontinuous annular recess located on an outside surface of said end portions; and wherein a first of said pipe end portions comprises a male coupler extending therefrom, and a second of said pipe end portions comprises a female coupler recess for receiving said male coupler in a locking arrangement within said tubular fitting member for minimizing the degree to which said first and second pipe end portions can rotate relative to one another.

8. The mechanical pipe connection of claim 7 wherein said male coupler and female coupler recess approximately match one another in size and shape.

9. The mechanical pipe connection of claim 7 wherein said connection provides unidirectional rotation resistance.

10. The mechanical pipe connection of claim 9 wherein said connection provides bidirectional rotation resistance.

11. A method of making a pipe connection which provides simultaneous rotation and thrust resistance between at least a first and second pipe, comprising:

(a) providing said first pipe having a first end portion including a male coupler extending therefrom;

(b) providing said second pipe having a second end portion including a female coupler recess for nesting with said male coupler in a locking arrangement;

(c) providing a tubular fitting member having a pair of open ends for receiving said first and second end portions therein, said tubular fitting member comprising annular locking means for locking the tubular fitting member to said first and second pipes;

(d) inserting said first and second end portions into the open ends of said tubular fitting member so that they meet and nest the male coupler with the female coupler recess to minimize the degree to which said first and second end portions of said first and second pipes can rotate relative to one another;

wherein said tubular fitting member comprises a pair of annular recesses disposed approximately near a pair of ends of said tubular fitting member, and wherein said first and second ends comprise a discontinuous annular recess for corresponding with said annular recesses of said tubular fitting member to form a pair of annular cavities, wherein said providing steps (a) and (b) comprise forming a recess in said first and second end portions to produce said male coupler and said female coupler recess.

12. The method of claim 11 wherein said first end portion comprises a female coupler recess and said second end portion comprises a male coupler.

* * * * *